United States Patent
Nishijima et al.

(10) Patent No.: US 7,258,952 B2
(45) Date of Patent: Aug. 21, 2007

(54) LITHIUM POLYMER SECONDARY CELL

(75) Inventors: Motoaki Nishijima, Nara (JP); Naoto Torata, Kashihara (JP); Naoto Nishimura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 709 days.

(21) Appl. No.: 10/475,262

(22) PCT Filed: Apr. 18, 2002

(86) PCT No.: PCT/JP02/03886

§ 371 (c)(1),
(2), (4) Date: Mar. 10, 2004

(87) PCT Pub. No.: WO02/087004

PCT Pub. Date: Oct. 31, 2002

(65) Prior Publication Data

US 2005/0074675 A1    Apr. 7, 2005

(30) Foreign Application Priority Data

Apr. 20, 2001    (JP) .............................. 2001-122096

(51) Int. Cl.
*H01M 6/18*    (2006.01)
(52) U.S. Cl. ...................... 429/304; 429/337; 429/317; 429/300; 29/623.1
(58) Field of Classification Search ................ 429/304, 429/337, 317, 300; 29/623.1
See application file for complete search history.

(56) References Cited

FOREIGN PATENT DOCUMENTS

| JP | 06-290794 | 10/1994 |
|---|---|---|
| JP | 10-223044 | 8/1998 |
| JP | 10-334946 | 12/1998 |
| JP | 11-265616 | 9/1999 |
| JP | 2000-067644 | 3/2000 |
| JP | 2000-067855 | 3/2000 |
| JP | 2000-082328 | 3/2000 |
| JP | 2000-082496 | 3/2000 |
| JP | 2000-173653 | 6/2000 |
| JP | 2001-110447 | * 4/2001 |
| JP | 2001-283911 | 10/2001 |
| JP | 2002-110243 | 4/2002 |

OTHER PUBLICATIONS

English translation of International Preliminary Examination Report mailed Dec. 3, 2003 in corresponding PCT Application No. PCT/JP02/03886.

* cited by examiner

*Primary Examiner*—Laura Weiner
(74) *Attorney, Agent, or Firm*—Nixon & Vanderhye, P.C.

(57) ABSTRACT

A lithium polymer secondary battery comprising a negative electrode, a positive electrode and an electrolyte layer between both electrodes, wherein the negative electrode and the positive electrode each has a solid electrolyte prepared by incorporating an organic electrolytic solution into a polymer, the polymer is obtained by solidifying a precursor solution containing vinylene carbonate and a content of vinylene carbonate in the precursor solution for the positive electrode is smaller than that in the precursor solution for the negative electrode.

7 Claims, 2 Drawing Sheets

LITHIUM POLYMER SECONDARY CELL

This application is the US national phase of international application PCT/JP02/03886 filed 18 Apr. 2002, which designated the US. PCT/JP02/03886 claims priority to JP Application No. 2001-122036 filed 20 Apr. 2001. The entire contents of these applications are incorporated herein by reference.

TECHNICAL FIELD

The present invention relates to a lithium polymer secondary battery. More particularly, the present invention relates to a lithium polymer secondary battery characterized by a content of vinylene carbonate in a precursor solution for use in obtaining a polymer included in a solid electrolyte, and had an excellent load characteristic, cycle characteristic and low temperature characteristic.

PRIOR ART

A secondary battery has been well used as a power supply for a portable device in consideration of cost effectiveness and others. Although various kinds of secondary batteries have been available, a nickel-cadmium battery is the most popular one at present and a nickel-hydrogen battery has also recently come to gain its popularity. Since a lithium secondary battery is higher in output voltage and energy density than the secondary batteries described above, it has been acquiring a place in the main stream. The lithium secondary battery employs: as a positive electrode active material, lithium cobalt oxide $LiCoO_2$, lithium nickel oxide $LiNiO_2$, a solid solution thereof $Li(Co_{1-x}Ni_x)O_2$, $LiMn_2O_4$ of a spinel structure or the like; as a negative electrode active material, a carbon material such as graphite; and an organic electrolytic solution containing a liquid organic compound as a solvent and a lithium compound as a solute. A current version of the lithium secondary battery is perfectly sealed in a metal can or the like in order to prevent liquid leakage.

In recent years, much of research activities have been directed to the lithium secondary battery using a solid electrolyte instead of an organic electrolytic solution. Since such a battery employs a solid electrolyte, no worry occurs of liquid leakage even by sealing with an easy-to-use resin film or the like, without sealing by using a metal can or the like to perfectness. Such a lithium secondary battery has a possibility of reduction of thickness in a battery as a feature.

While there have been available some kinds of solid electrolytes described above, an attention is focused on gel solid electrolytes each retaining an electrolytic solution prepared by dissolving a lithium salt or the like into a non-aqueous solvent in a polymer, as a solid electrolyte meeting a performance required in a battery in recent years. The gel solid electrolytes are classified into two categories, in one of which a polymer such as a fluorine containing polymer represented by polyvinylidene fluoride (PVdF) or a polyacrylonitrile (PAN) is impregnated with an electrolytic solution prepared by dissolving a lithium salt or the like into an organic solvent to thereby create a gel state (a physical gel) and in the other of which polymerization is performed by giving energy such as heat or light to a solution prepared by mixing a monomer having at least one or more unsaturated double bonds in a molecule and an electrolytic solution prepared by dissolving a lithium salt or the like into a non-aqueous solvent together to thereby obtain a gel solid electrolyte (chemical gel).

Since any of gel solid electrolytes is, however, lower in ionic conductivity, as compared with the electrolytic solution prepared by dissolving the lithium salt or the like into the organic solvent, there have been arisen problems that a load characteristic and a cycle characteristic of a battery are poor and a capacity thereof at low temperatures is low, as typical faults, in a case where gel solid electrolytes are used in batteries. Many of trials, in order to solve such problems, have been conducted about various additive agents in the electrolyte or the polymer.

Among additive agents, vinylene carbonate has been generally known. As secondary batteries employing this additive agent, there have been known: batteries improved in an ionic conductivity and therefore, good in load characteristic (for example, Japanese Unexamined patent Publication No. HEI 10(1998)-223044, Japanese Unexamined patent Publication No. HEI 11(1999)-265616, Japanese Unexamined patent Publication No. 2000-82328, Japanese Unexamined patent Publication No. 2000-82496, Japanese Unexamined patent Publication No. 2000-67644 and others); batteries improved in cycle characteristic (for example, Japanese Unexamined patent Publication No. HEI 10(9998)-334946, Japanese Unexamined patent Publication No. 2000-67855 and others); and others. In any of secondary batteries of this kind, no satisfaction has yet been achieved simultaneously with respect to both performances of a cycle characteristic and a load characteristic.

According to Japanese Unexamined patent Publication No. 2000-67855, it is described that improvement can be achieved simultaneously in both of performances of a cycle performance and a load characteristic. The number of cycles in the publication, however, is only on the order of 20 cycles, which cannot be said to be sufficient in consideration of a situation of practical use of a device.

DISCLOSURE OF THE INVENTION

The present invention has been made in light of the above problems. An object of the present invention is to provide a lithium polymer secondary battery excellent in both of a load characteristic and a cycle characteristic and furthermore, excellent in low temperature characteristic.

According to the present invention, provided is a lithium polymer secondary battery comprising a negative electrode, a positive electrode and an electrolyte layer between both electrodes, wherein the negative electrode and the positive electrode each contains a solid electrolyte prepared by incorporating an organic electrolytic solution into a polymer, the polymer is obtained by solidifying a precursor solution containing vinylene carbonate and a content of vinylene carbonate in the precursor solution for the positive electrode is smaller than that in the precursor solution for the negative electrode.

According to the present invention, provided is a fabrication method for the above lithium polymer secondary battery comprising the steps of separately solidifying precursor solutions of polymers included in solid electrolytes of a positive electrode and a negative electrode; and thereafter, sticking the positive electrode and the negative electrode to each other with an electrolyte layer interposed therebetween.

According to the present invention, provided is a fabrication method for the above lithium polymer secondary battery comprising the steps of preliminary-solidifying a precursor solution of a polymer included in a solid electrolyte of one of a positive electrode and a negative electrode, or separately preliminary-solidifying precursor solutions of polymers included in the solid electrolytes of the positive electrode and the negative electrode, thereafter, sticking the positive electrode and the negative electrode to each other with an electrolyte layer interposed therebetween and furthermore, heat treating the composite of the electrodes with the electrolyte layer to thereby solidify the precursor solutions preliminary-solidified.

DESCRIPTION OF THE EMBODIMENTS FOR CARRYING OUT THE INVENTION

Figure 1:
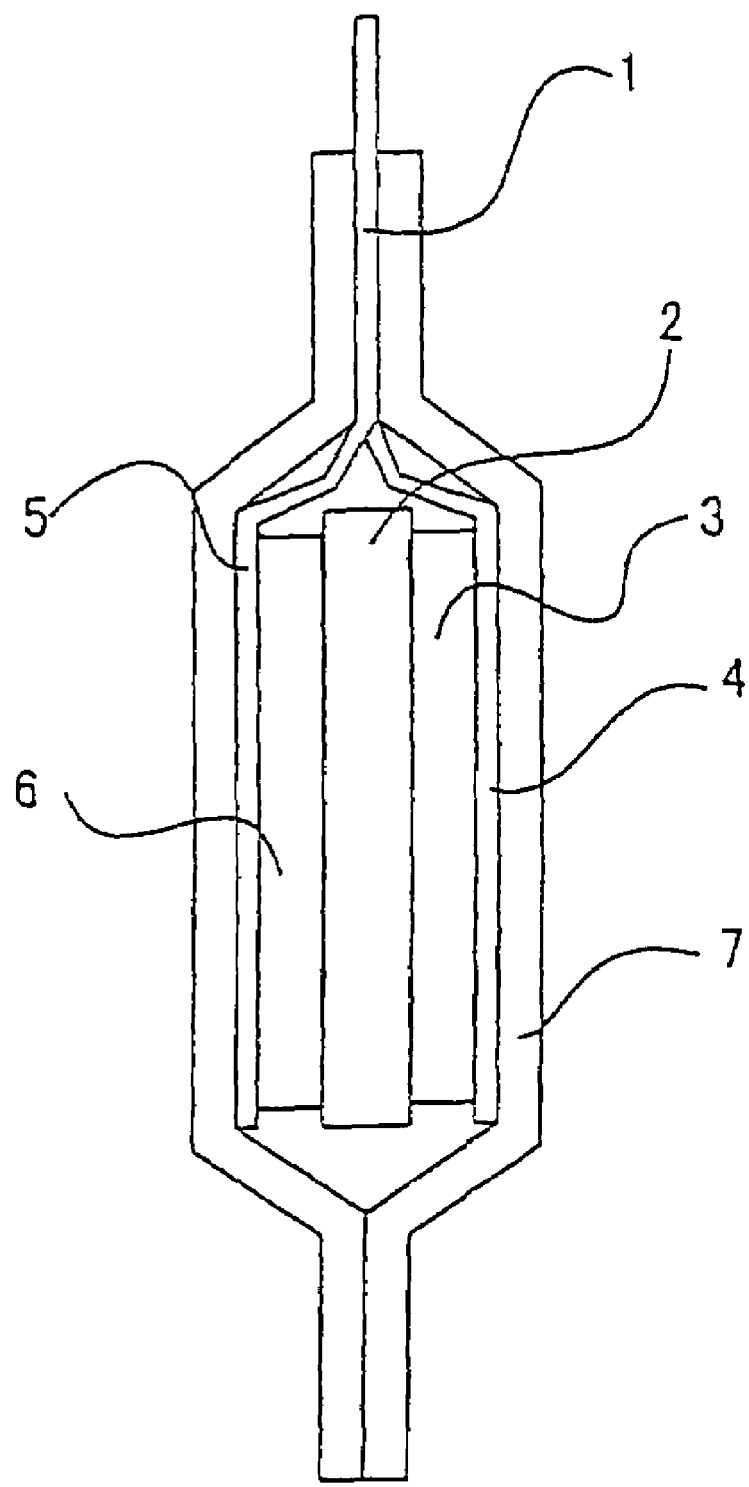
FIG. 1 is a structural view shown a basic structure of a lithium polymer secondary battery of the present invention.

The lithium polymer secondary battery of the present invention has one of features thereof that vinylene carbonate in the precursor solution for forming a polymer included in the solid electrolyte in the positive electrode is smaller in content than that in the precursor solution for forming the polymer included in the solid electrolyte solution in a negative electrode. It was found that with this feature, performances of the positive electrode and the negative electrode are sufficiently exerted, as a result, enabling the lithium polymer secondary battery excellent in load characteristic and cycle characteristic to be provided.

Though a detailed action and mechanism caused by vinylene carbonate is still indefinite, it is considered in the following way why there can be provided the lithium polymer secondary battery excellent in cycle characteristic and load characteristic. Since vinylene carbonate is of a high dielectric constant, migration of a lithium ion in the solid electrolyte is allowed to be fast. As a result, a load characteristic can be improved. Furthermore, vinylene carbonate also works as a chain transfer agent in a polymerization reaction and can immediately transfer radicals generated by cleavage of an initiator due to energies such as light and heat. Therefore, the polymerization reaction progresses fast, thereby enabling a strong network to be formed. As a result, stable performances can be ensured over cycles in a long term because of improvement in strength of a gel generated.

In the present invention, a preferable content of vinylene carbonate is 7 wt % or less in the precursor solution for the positive electrode while a preferable content of vinylene carbonate is 10 wt % or less in the precursor solution for the negative electrode.

According to a result of the investigation conducted by the inventors of the present invention, if a content of vinylene carbonate in the precursor solution for the positive electrode exceeds 7 wt %, a load characteristic of the solid electrolyte in the positive electrode is degraded and as a result, a load characteristic as the battery is also degraded with ease. Therefore, a content of vinylene carbonate in the precursor solution for the positive electrode is preferably 7 wt % or less. The lowest value of a content of vinylene carbonate in the precursor solution for the positive electrode is 0 wt %.

According to a result of the investigation conducted by the inventors of the present invention, if a content of vinylene carbonate is in excess on the negative electrode side, a load characteristic of the battery is degraded in a similar manner to the case of the positive electrode. When the content is up to a value of the order of 10 wt %, a great influence is not exerted on the load characteristic. Therefore, a content of vinylene carbonate in the precursor solution for the negative electrode is preferably 10 wt % or less. A content of vinylene carbonate in the precursor solution for the negative electrode has only to be more than that in the precursor solution of the positive electrode. The lowest value of the content may be 0.1 wt %, which is a measurement limit value. The lowest value is desirably 3 wt % or more.

In the lithium polymer secondary battery of the present invention, the solid electrolyte preferably contains at least γ-butylolactone as a solvent. Especially, by incorporating γ-butylolactone into the solid electrolyte of the positive electrode, the electrolyte becomes hard to be oxidized, depending on a potential at the positive electrode.

More detailed description will be given of the present invention below:

In FIG. 1, there is shown a basic structure of a battery of the present invention. A reference numeral 1 in the FIG. 1 indicates an electrode terminal, 2 an electrolyte layer, 3 a positive electrode material and an electrolyte, 4 a positive electrode current collector made of a copper foil, 5 a negative current collector made of an aluminum foil, 6 a negative electrode material and an electrolyte, and 7 a packaging resin film for intercepting communication between the battery and the outside air.

As organic solvents contained in the positive electrode and the negative electrode, and the electrolyte layer interposed therebetween, there are exemplified: cyclic carbonates such as propylene carbonate, ethylene carbonate, butylene carbonate, and the like; chain carbonates such as diethyl carbonate, dimethyl carbonate, methylethyl carbonate and the like; lactones such as γ-butylolactone, γ-valerolactone, δ-valerolactone and the like; cyclic ethers such as tetrahydrofuran, 2-methyltetrahydrofuran and the like; ethers suclaneh as dioxolane, diethyl ether, dimethoxyethane, diethoxyethane, methoxyethoxyethane and the like, esters such as dimethylsulfoxide, sulfolane, methylsulfolane, acetonitrile, methyl formate, methyl acetate, ethyl acetate and the like; glymes such as methyldiglyme, ethyldiglyme and the like; alcohols such as ethylene glycol, methyl cellosolve, glycerin and the like; nitrites such as acetonitrile, propionitrile, methoxyacetonitrile, 3-methoxypropionitrile, and the like; amids such as N-methylformamide, N-ethylformamide, N,N-dimethylformamide, N,N-diethylformamide, N-methylacetoamide, N-ethylacetoamide, N, N-dimethylacetoamide, N-methylpyrrolidone, N-methyl-2-pyrrolidone and the like; sulfolanes such as sulfolane, 3-methylsulfolane and the like; and phosphoric acid esters such as trimethylphosphate, triethylphosphate and the like. The organic solvent may be used in one kind of a solvent described above or combining two or more kinds selected from the group consisting of the solvents described above.

The positive electrode and the negative electrode may be different from each other in respect of kind of the polymer or an organic electrolytic solution included in the solid electrolyte used in the present invention and in respect of composition of the organic solvent contained in the organic electrolytic solution.

As an organic solvent used on the positive electrode side is preferably a solvent hard to be oxidized at a potential of the positive electrode. To be concrete, a solvent preferably contains γ-butylolactone.

As an organic solvent used on the negative electrode side is preferably used an organic solvent, excellent in reducing property in the vicinity of a potential at the negative electrode, and causing no decomposition reaction on a carbon material in a case where there is employed the carbon material with a high crystallinity as a negative electrode material. To be concrete, the organic solvent preferably contains ethylene carbonate.

As solutes (electrolyte salts), no specific limitation is placed on a particular solute, but publicly known solutes can be used. To be concrete, there are exemplified: lithium salts such as lithium perchlorate, lithium borofluoride, lithium hexafluorophosphate, lithium hexafluoroarsenide, lithium trifluoromethanesulfonate, lithium halide, lithium chloroaluminate and the like.

Different solutes may be used, respectively, in the positive electrode, the negative electrode and the electrolyte layer interposed therebetween, or alternatively, different mixing ratios of plural kinds of solutes combined may be used, respectively, in the positive electrode, the negative electrode and the electrolyte layer. A concentration of the solute dissolved in the organic solvent is preferably in the range of from 1.0 to 3.5 mol/l and more preferably in the range of from 1.0 to 2.75 mol/l.

If water is contained in the organic solvent, decomposition due to water and the like occur as an adverse effect while charging/discharging of the battery, which invites problems of reduction in efficiency of the battery itself and decrease in cycle lifetime, and furthermore, generation of gas. Therefore, water in an electrolyte solvent is preferably reduced at the lowest possible content. For this reason, the organic solvent may be dehydrated using molecular sieve, an alkali metal, an alkali earth metal or an alkali metal hydride such as calcium hydride, or using active aluminum or the like. Water content contained in the organic solvent is preferably 1000 ppm or less and more preferably 100 ppm or less.

The composition of the electrolyte layer interposed between the positive electrode and the negative electrode may be the same composition as the electrolyte of the positive electrode or as the electrolyte of the negative electrode. Furthermore, the electrolyte layer may be a layer prepared by impregnating a porous material such as porous polyethylene, porous propylene or a non-woven fabric with the electrolyte in order to improve a mechanical strength thereof. A thickness of the electrolyte layer is preferably in the range of from 10 to 100 µm since if the thickness is excessively thin, a short circuit in the battery is caused, while if thick in excess, a current characteristic of the battery at a large current flow or an energy density of the battery is degraded.

The positive electrode of the lithium polymer secondary battery of the present invention can be fabricated using a mixture obtained by mixing a powder of a transition metal oxide or a lithium transition metal oxide as a positive electrode active material with a conductor, a binder and a solid electrolyte.

As the transition meal oxide, there can be exemplified: vanadium oxide $V_2O_5$, chromium oxide $Cr_3O_8$. As the lithium transition metal oxide, there can be exemplified: lithium cobalt oxide ($Li_xCoO_2$: $0<x<2$), lithium nickel oxide ($Li_xNiO_2$: $0<x<2$), lithium nickel cobalt oxide composite oxide ($Li_x(Ni_{1-y}Co_y)O_2$: $0<x<2$, $0<y<1$), lithium manganese oxide ($Li_xMn_2O_4$: $0<x<2$), lithium vanadium oxide($LiV_2O_5$, $LiVO_2$), lithium tungsten oxide ($LiWO_3$), lithium molybdenum oxide ($LiMoO_3$) and the like.

There can also be used an electronic conductor when required in order to increase an electronic conductivity of the positive electrode. As the conductor, there can be used: carbon material such as acetylene black, graphite powder and the like; and metal powder and conductive ceramics.

As an negative electrode active material in the lithium polymer secondary battery of the present invention, there can be preferably exemplified: metallic lithium; a lithium alloy such as lithium aluminum; materials each capable of intercalation/deintercalation of lithium ion (for example, conductive polymers such as polyacetylene, polythiophene, polyparaphenylene and the like; thermal decomposed carbon; thermal decomposed carbon obtained by thermal decomposition in a vapor phase in the presence of a catalyst; carbon obtained by calcination from pitch, cokes, tar or the like; carbon obtained by calcinating a polymer such as cellulose, phenol resin or the like; graphite materials such as natural graphite, artificial graphite; expanded graphite; and the like); and materials such as $WO_2$, $MoO_2$ and the like capable of a reaction of intercalating/deintercalating lithium ion, alone or in composites of materials described above. Among them, preferable is a carbon material including thermal decomposed carbon, thermal decomposed carbon obtained by thermal decomposition in a vapor phase in the presence of a catalyst, carbon obtained by calcination from pitch, cokes, tar or the like, carbon obtained by calcinating a polymer such as cellulose, phenol resin or the like, natural graphite, artificial graphite, expanded graphite and the like.

The carbon material in the form of particles is preferably used. A particle size distribution of the carbon material preferably spreads across the range of the order from 0.1 to 150 µm. Diameter of particle smaller than 0.1 µm is not preferable since a possibility arises that internal short circuits occur through pores in a separator of the battery. Diameter of particle larger than 150 µm is not preferable either since homogeneity in an electrode is reduced, a packing density of an active material decreases and handlability in a fabrication process for an electrode is degraded. The particle size distribution more preferably spreads across the range of from 0.5 to 50 µm.

Furthermore, as the negative electrode active material, there can be used a graphite material obtained by attaching carbon low in crystallinity on surface of graphite as core material. The graphite material obtained by attaching carbon low in crystallinity on surface of graphite each high in crystallinity can be prepared by attaching carbon low in crystallinity onto surface of the graphite material described above by means of a vapor phase method, a liquid phase method, a solid phase method or the like. The material obtained by attaching carbon low in crystallinity on surface of the graphite in such ways is preferable since it embodies an effect of reducing a specific surface area of the core material (the graphite material). An electronic conductor can also be used in the negative electrode when required in order to increase of an electronic conductivity of the electrode. As the conductor, there can be used: carbon materials such as acetylene black, graphite powder and the like; metal powder and conductive ceramics.

Description will be given of a method for fabricating the electrode of the lithium polymer secondary battery material of the present invention below:

First of all, a mixture of the positive electrode active material or the negative electrode active material and, if necessary, the electronic conductor is under pressure, bonded onto a current collector. Alternatively, this mixture is further mixed with a binder for fixing itself on a metal foil and thereafter, dissolved into a solvent such as N-methyl-2-pyrrolidone or the like into a slurry, which is applied on the current collector to dry the coat.

As the binder, there can be used: fluorine containing polymers such as Teflon (R) resin powder, polytetrafluoroethylene, polyvinylidene fluoride and the like; and polyolefines such as polyethylene, polypropylene and the like. A mixing ratio of the components described above can be such that the conductor is in the range of from 1 to 500 parts by wt, and the binder is in the range of from 1 to 50 parts by wt relative to 100 parts by wt of the active material. If the conductor is less than 1 part by wt, resistance of the electrode increases or polarization in the electrode becomes conspicuous to thereby reduce a capacity as the electrode, thus disabling a practical lithium polymer secondary battery to be fabricated. If the conductor is more than 50 parts by wt, a content of the lithium transition metal oxide in the electrode is reduced; therefore, a risk arises that a capacity decreases, which is not preferable. If the binder is less than 1 part by wt, a binding ability disappears, making it difficult to fabricate the electrode. If the binder is more than 50 parts by wt, resistance of the electrode increases or polarization in the electrode becomes conspicuous to thereby reduce a capacity because of reduction in content of the lithium metal oxide in the electrode, which is impractical.

Description will be given of production of the solid electrolyte below. In a producing method for the solid electrolyte in the present invention, a monomer (a precursor) or the like is mixed into the organic solvent added with the lithium salt as the solute and vinylene carbonate to obtain a precursor solution, which can then be subjected to a crosslinking reaction or polymerization reaction for solidification. As the monomer, there can be exemplified: ethylene oxide; propylene oxide; a compound having an acryloyl group or a methacryloyl group as a terminal group in a molecule; a block polymer containing an ethylene oxide unit and a propylene oxide unit in the monomer; and the like. A polymer may be polyfunctional at polymerization sites so as to construct a three-dimensional crosslinked gel structure. Furthermore, mixing the monomer with a monofunctional group and a monomer with a polyfunctional group together can lead to production of various solid electrolytes having crosslinked or non-crosslinked structures. An amount of the monomer relative to the solvent is preferably in the range of from 1 to 10 vol. % since if the amount is excessively small, solidification becomes difficult while if the amount is excessively large, a lithium ionic conductivity is degraded.

There may also be added a thermal or photo-polymerization initiator for promoting a crosslinking reaction or a polymerization. As the thermal polymerization initiator, there can be exemplified: compounds based on diacyl peroxide; peroxyester; peroxydicarbonate; azo-compound; and the like. As the photopolymerization initiator, there can be exemplified: compounds based on phosphine oxide; acetophenone; benzophenone, α-hydroxy ketone; Michler's ketone; benzyl; benzoin; benzoin ether; benzyldimethyl ketal; and the like. The initiators may be used alone or in combination of two or more kinds.

The electrode fabricated in the method described above is impregnated with the precursor solution obtained by mixing the organic solvent with the lithium salt as the solute, vinylene carbonate, the monomer and, when required, the initiator together. As a method for impregnation, there may be exemplified: a method in which the electrode is only immersed into the precursor solution, or when required, the electrode may be impregnated therewith under a reduced pressure or a raised pressure.

Then, a polymerization reaction of the precursor solution with which the electrode is impregnated is started to be solidified. The positive electrode and negative electrode of the battery of the present invention are different from each other in content of vinylene carbonate in the precursor solution in the electrode. Therefore, a method in which one of the solutions of the precursors of the polymers in the positive electrode and negative electrode is solidified or alternatively, the precursor solutions of the positive electrode and the negative electrode are separately solidified, thereafter the positive electrode and the negative electrode are stacked onto each other with the electrolyte layer interposed therebetween to eventually fabricate the battery is preferred to a method in which the solutions of the precursors of polymers of the positive electrode and negative electrode, respectively, are solidified after the both electrodes are stacked on each other with the electrolyte layer interposed therebetween to eventually fabricate the battery.

As methods for solidifying the solution of the precursor of the polymer in the electrode, methods have been available; one of which is a method in which the precursor solution is solidified by starting a polymerization reaction with light and the other of which is a method in which the precursor solution is solidified by starting a polymerization reaction with heat. Light for starting the reaction may be visual light or ultraviolet. In a case where starting of the reaction with heat may be performed at a temperature in the range of from 30° C. to 150° C., whereas the temperature is, however, preferable in the range of from 40° C. to 100° C. in consideration of a reaction time or a boiling point of the solvent in use.

The lithium polymer secondary battery in the present invention can be fabricated in a procedure that the positive electrode and the current collector, and the negative electrode and the current collector, described above are bonded to respective external electrodes, and the electrolyte layer described above is sandwiched therebetween. A shape of the secondary battery of the present invention is not specifically limited to a particular one, but as shapes of the secondary battery, there are exemplified: a cylinder, a button, a rectangular prism, a sheet and the like, on which again no specific limitation is imposed. A fabrication process of the battery is preferably performed in an inert atmosphere such as argon or in a dry air atmosphere in order to prevent water from intruding in the battery.

As a method for fabricating the solid electrolyte of the present invention in addition to the above methods, a method may be available in which after a polymer is formed, the polymer is impregnated with the electrolytic solution for solidification. To be detailed, the method goes this way: a mixture is prepared of the positive electrode active material or the negative electrode active material and one or more kinds selected from the group consisting of polymers such as polyvinylidene fluoride, tetrafluoroethylene, hexafluoropropylene, chlorotrifluoroethylene, polymethylmethacrylate, polyvinyl chloride and the like, and the mixture is dissolved into a solvent such as tetrahydrofulane, N-methyl-2-pyrrolidone or the like, the mixture dissolved in the solvent is cast, followed by removal of the solvent in drying or the like and the cast mixture free of the solvent is impregnated with the electrolytic solution containing vinylidene carbonate to thereby enable the solid electrolyte to be obtained.

EXAMPLES

Concrete description will be given of the present invention with examples and the present invention, however, is not limited any way with respect of the scope thereof by description in the examples.

Example 1

A lithium polymer secondary battery of the present invention was fabricated according to the following procedure: Lithium cobalt oxide $LiCoO_2$ was used as a positive electrode active material. $LiCoO_2$ was synthesized according to a publicly known method. Data obtained in X-ray diffraction measurement using CuKα line at an output of 2 kW from a sealed tube accommodating a Cu target as an X-ray source, a valence analysis of Co with the iodometry method and an element analysis with ICP confirmed a specimen of the synthesized compound as $LiCoO_2$.

The synthesized compound was pulverized in a mortar and mixed with 10 wt % of acetylene black as a conductor and 10 wt % of Teflon (R) resin as a binder. The mixture was dissolved into a solvent such as N-methyl-2-pyrrolidone or the like to produce a slurry and the slurry was applied onto an aluminum foil according to a doctor blade method, followed by drying and then pressing.

A surface of the positive electrode thus fabricated was covered with a non-woven fabric of 20 μm in thickness and the positive electrode and the non-woven fabric were impregnated with a precursor solution prepared in a procedure that $LiPF_6$ was dissolved, at a concentration of 1 mol/l, into 46.5 wt % of ethylene carbonate, 46.5 wt % of γ-butylolactone and 7 wt % of vinylene carbonate as an electrolyte, combined and furthermore, 10 wt % of a copolymer of ethylene oxide and propylene oxide relative to the electrolyte and a photopolymerization initiator and a thermal polymerization initiator were mixed into the resulting solution, followed by polymerization under illumination with ultraviolet.

Natural graphite powder was used as a negative electrode active material. About 10 wt % of Teflon (R) resin powder as a binder was mixed into the natural graphite powder. The mixture was dissolved into a solvent such as N-methyl-2-pyrrolidone or the like to prepare a slurry and the slurry was coated on a copper foil and dried, followed by pressing. The negative electrode thus fabricated was impregnated with a precursor solution prepared in a procedure that $LiPF_6$ was dissolved, at a concentration of 1 mol/l, into 45 wt % of ethylene carbonate, 45 wt % of γ-butylolactone and 10 wt % of vinylene carbonate as an electrolyte and furthermore, 10 wt % of a copolymer of ethylene oxide and propylene oxide relative to the electrolyte and a photopolymerization initiator and a thermal polymerization initiator were mixed into the resulting solution, followed by a heat treatment at 60° C. for 24 hours.

Figure 2:
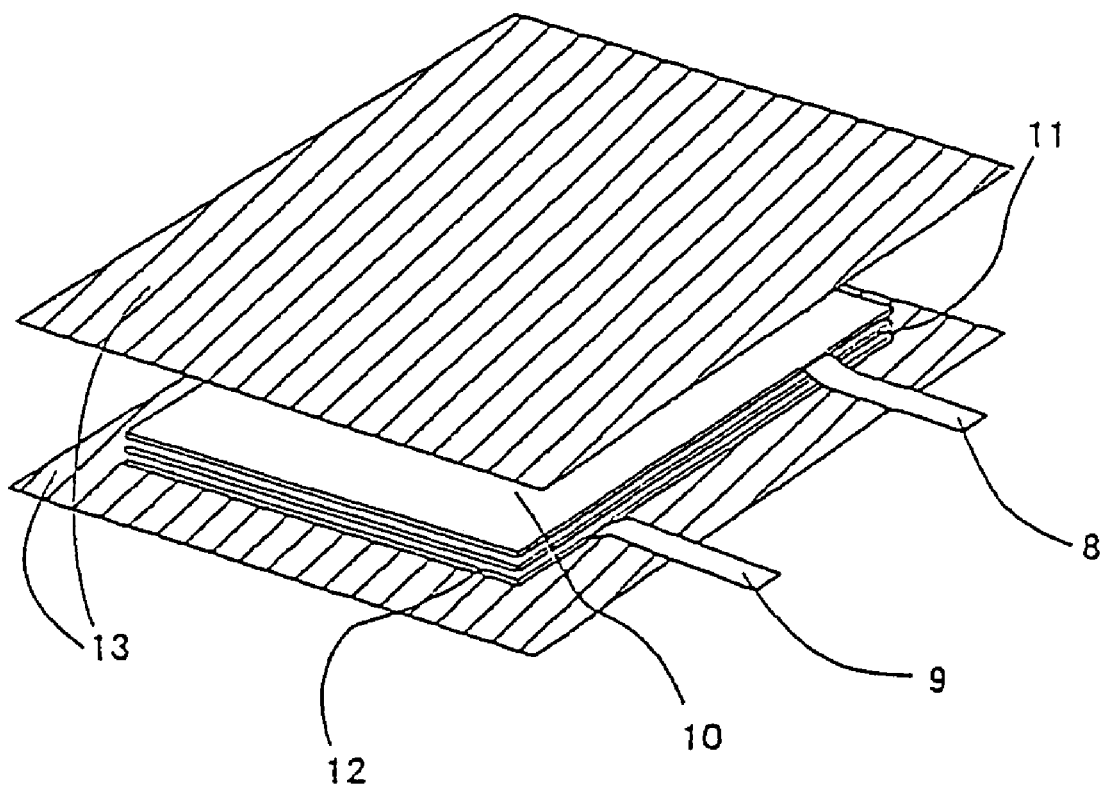
FIG. 2 is a model view of a structure of a lithium polymer secondary battery fabricated in Example 1.

Then, the positive electrode and the negative electrode were superposed on each other and the superposed composite was sandwiched between two aluminum foil laminated resin films and the superposed composite sandwiched between the films was heat-fused to fabricate a sheet-shaped battery and the battery received a heat treatment at 60° C. for 24 hours. FIG. 2 shows a model view of a structure of the battery of Example 1. In FIG. 2, a reference numeral 8 indicates a positive electrode terminal, 9 a negative electrode terminal, 10 a positive electrode current collector, 11 a solid electrolyte layer, 12 a negative electrode current collector and 13 packaging resin films.

Performance evaluation of a battery was conducted using the following method. The battery was charged and discharged at a first cycle at a constant current of 10 mA. Note that the upper limit of charging is set at 4.1 V and the lower limit thereof was set at 3.0 V and measurement was conducted at a constant temperature of 25° C. in an atmospheric air environment. A discharge capacity in the first cycle is defined as the capacity of the battery. Furthermore, after charging at 10 mA discharging was conducted at 100 mA to obtain a load characteristic using the discharge capacity according to the following formula.

Load Characteristic (%)=Discharge Capacity at 100 mA/Battery Capacity

After charging at 25° C. and a current of 10 mA, discharging was conducted at −20° C. and a temperature characteristic is defined using the discharge capacity according to the following formula.

Temperature Characteristic (%) Discharge Capacity at −20° C./Battery Capacity

Subsequently, charging/discharging at 100 mA was repeated and after 500 cycles elapses, a discharge capacity was measured and a capacity retentivity is defined using the discharge capacity according to the following formula.

Capacity Retentivity (%)=Discharge Capacity after 500 cycles/Battery Capacity

Example 2

A surface of a positive electrode fabricated in the same procedure as in Example 1 was covered with a non-woven fabric of 20 μm in thickness and the positive electrode and the non-woven fabric were impregnated with a precursor solution prepared in a procedure that $LiBF_4$ was dissolved, at a concentration of 1 mol/l, into 48.5 wt % of ethylene carbonate, 48.5 wt % of γ-butylolactone and 3 wt % of vinylene carbonate as an electrolyte and furthermore, 5 wt % of a copolymer of ethylene oxide and propylene oxide relative to the electrolyte and a photopolymerization initiator were mixed into the resulting solution, followed by polymerization under illumination with ultraviolet. A negative electrode fabricated in the same procedure as in Example 1 was impregnated with a precursor solution prepared in a procedure that $LiPF_6$ was dissolved, at a concentration of 1 mol/l, into 45 wt % of ethylene carbonate, 45 wt % of γ-butylolactone and 10 wt % of vinylene carbonate as an electrolyte and furthermore, 10 wt % of a copolymer of ethylene oxide and propylene oxide relative to the electrolyte and a photopolymerization initiator and a thermal polymerization initiator were mixed into the resulting solution, followed by polymerization under illumination with ultraviolet.

Then, the positive electrode and the negative electrode were superposed on each other and the superposed composite was sandwiched between two aluminum foil laminated resin films and the superposed composite sandwiched between the films was heat-fused to fabricate a sheet-shaped battery and the battery received a heat treatment at 60° C. for 24 hours. Thereafter, a battery performance was evaluated in the same way as in Example 1.

Example 3

As a positive electrode active material, $LiNiO_2$ was used. $LiNiO_2$ was produced according to a publicly known method. An electrode was fabricated in the same procedure as in Example 1 using $LiNiO_2$. A surface of the positive electrode was covered with a non-woven fabric of 20 μm in thickness and the positive electrode and the non-woven fabric were impregnated with a precursor solution prepared in a procedure that $LiBF_4$ was dissolved, at a concentration of 1 mol/l, into 50 wt % of ethylene carbonate and 50 wt % of γ-butylolactone (therefore 0 wt % of vinylene carbonate)

as an electrolyte and furthermore, 5 wt % of a copolymer of ethylene oxide and propylene oxide relative to the electrolyte, a photopolymerization initiator and a thermal polymerization initiator were mixed into the resulting solution, followed by polymerization under illumination with ultraviolet. A negative electrode fabricated in the same procedure as in Example 1 was impregnated with a precursor solution prepared in a procedure that $LiPF_6$ was dissolved, at a concentration of 1 mol/l, into 49.5 wt % of ethylene carbonate, 49.5 wt % of γ-butylolactone and 1 wt % of vinylene carbonate as an electrolyte and furthermore, 10 wt % of a copolymer of ethylene oxide and propylene oxide relative to the electrolyte and a thermal polymerization initiator were mixed into the resulting solution.

Then, the positive electrode and the negative electrode were superposed on each other and the superposed composite was sandwiched between two aluminum foil laminated resin films and the superposed composite sandwiched between the films was heat-fused to fabricate a sheet-shaped battery and the battery received a heat treatment at 60° C. for 24 hours to simultaneously solidify the negative electrode. Thereafter, a battery performance was evaluated in the same way as in Example 1.

Example 4

As a positive electrode active material, $LiNiO_2$ produced in the same way as in Example 3 was used. A positive electrode was fabricated in the same as in Example 1 using $LiNiO_2$. A surface of the positive electrode was covered with a non-woven fabric of 20 μm in thickness and the positive electrode and the non-woven fabric were impregnated with a precursor solution prepared in a procedure that $LiBF_4$ was dissolved, at a concentration of 1 mol/l, into 46.5 wt % of proylene carbonate, 46.5 wt % of γ-butylolactone and 7 wt % of vinylene carbonate as an electrolyte and furthermore, 5 wt % of a copolymer of ethylene oxide and propylene oxide relative to the electrolyte and a thermal polymerization initiator were mixed into the resulting solution, followed by a heat treatment at 60° C. for 24 hours.

A negative electrode fabricated in the same procedure as in Example 1 was impregnated with a precursor solution prepared in a procedure that $LiPF_6$ was dissolved, at a concentration of 1 mol/l, into 45 wt % of ethylene carbonate, 45 wt % of γ-butylolactone and 10 wt % of vinylene carbonate as an electrolyte, combined and furthermore, 15 wt % of a copolymer of ethylene oxide and propylene oxide relative to the electrolyte and a thermal polymerization initiator were mixed into the resulting solution, followed by a heat treatment at 60° C. for 24 hours.

Then, the positive electrode and the negative electrode were superposed on each other and the superposed composite was sandwiched between two aluminum foil laminated resin films and the superposed composite sandwiched between the films was heat-fused to fabricate a sheet-shaped battery. Thereafter, a battery performance was evaluated in the same way as in Example 1.

Example 5

As a positive electrode active material, $LiMn_2O_4$ was used. $LiMn_2O_4$ was produced according to a publicly known method. An electrode was fabricated in the same procedure as in Example 1 using $LiMn_2O_4$. A surface of the positive electrode thus fabricated was covered with a non-woven fabric of 20 μm in thickness and the positive electrode and the non-woven fabric were impregnated with a precursor solution prepared in a procedure that $LiBF_4$ is dissolved, at a concentration of 1 mol/l, into 48.5 wt % of propylene carbonate, 48.5 wt % of γ-butylolactone and 3 wt % of vinylene carbonate as an electrolyte and furthermore, 5 wt % of a copolymer of ethylene oxide and propylene oxide relative to the electrolyte and a thermal polymerization initiator were mixed into the resulting solution, followed by a heat treatment at 60° C. for 24 hours.

A negative electrode fabricated in the same procedure as in Example 1 was impregnated with a precursor solution prepared in a procedure that $LiPF_6$ was dissolved, at a concentration of 1 mol/l, into 45 wt % of ethylene carbonate, 45 wt % of γ-butylolactone and 10 wt % of vinylene carbonate as an electrolyte and furthermore, 10 wt % of a copolymer of ethylene oxide and propylene oxide relative to the electrolyte, and a photopolymerization initiator and a thermal polymerization initiator were mixed into the resulting solution, followed by polymerization under illumination with ultraviolet.

Then, the positive electrode and the negative electrode were superposed on each other and the superposed composite was sandwiched between two aluminum foil laminated resin films and the superposed composite sandwiched between the films was heat-fused to fabricate a sheet-shaped battery and the battery received a heat treatment at 60° C. for 24 hours. Thereafter, a battery performance was evaluated in the same way as in Example 1.

Example 6

As a positive electrode active material, $LiMn_2O_4$ was used. $LiMn_2O_4$ was produced according to a publicly known method. An electrode was fabricated in the same procedure as in Example 1 using $LiMn_2O_4$. A surface of the positive electrode thus fabricated was covered with a non-woven fabric of 20 μm in thickness and the positive electrode and the non-woven fabric were impregnated with a precursor solution prepared in a procedure that $LiBF_4$ was dissolved, at a concentration of 1 mol/l, into 50 wt % of propylene carbonate and 50 wt % of γ-butylolactone (therefore, 0 wt % of vinylene carbonate) as an electrolyte and furthermore, 10 wt % of a copolymer of ethylene oxide and propylene oxide relative to the electrolyte and a thermal polymerization initiator were mixed into the resulting solution, followed by a heat treatment at 60° C. for 24 hours.

A negative electrode fabricated by calcining phenol resin at 1200° C. in an inert atmosphere (nitrogen) was impregnated with a precursor solution prepared in a procedure that $LiPF_6$ was dissolved, at a concentration of 1 mol/l, into 45 wt % of ethylene carbonate, 45 wt % of γ-butylolactone and 10 wt % of vinylene carbonate as an electrolyte and furthermore, 10 wt % of a copolymer of ethylene oxide and propylene oxide relative to the electrolyte and a thermal polymerization initiator were mixed into the resulting solution.

Then, the positive electrode and the negative electrode were superposed on each other and the superposed composite was sandwiched between two aluminum foil laminated resin films and the superposed composite sandwiched between the films was heat-fused to fabricate a sheet-shaped battery and the battery received a heat treatment at 60° C. for 24 hours to simultaneously solidify the negative electrode. Thereafter, a battery performance was evaluated in the same way as in Example 1.

Comparative Example 1

A battery was fabricated in the same procedure as in the Example 2 with the exception that in Comparative Example 1, 50 wt % of ethylene carbonate and 50 wt % of γ-butylolactone were used as an electrolyte and a negative electrode. Thereafter, a battery performance was evaluated in the same way as in Example 1.

Comparative Example 2

A battery was fabricated in the same procedure as in the Example 2 with the exception that in Comparative Example 2, 50 wt % of propylene carbonate and 50 wt % of γ-butylolactone were used as an electrolyte in a positive electrode while 50 wt % of ethylene carbonate and 50 wt % of γ-butylolactone were used as an electrolyte in a negative electrode. Thereafter, a battery performance was evaluated in the same way as in Example 1.

Comparative Example 3

A battery was fabricated in the same procedure as in the Example 2 with the exception that in Comparative Example. 3, 46.5 wt % of ethylene carbonate, 46.5 wt % of γ-butylolactone and 7 wt % of vinylene carbonate were used as an electrolyte in a positive electrode while 49 wt % of ethylene carbonate, 49 wt % of γ-butylolactone and 2 wt % of vinylene carbonate were used as an electrolyte in a negative electrode. Thereafter, a battery performance was evaluated in the same way as in Example 1.

Comparative Example 4

A battery was fabricated in the same procedure as in the Example 2 with the exception that in Comparative Example 4, 47.5 wt % of propylene carbonate, 47.5 wt % of γ-butylolactone and 5 wt % of vinylene carbonate were used as an electrolyte in a positive electrode while 47.5 wt % of ethylene carbonate, 47.5 wt % of γ-butylolactone and 5 wt % of vinylene carbonate were used as an electrolyte in a negative electrode. Thereafter, a battery performance was evaluated in the same way as in Example 1.

Comparative Example 5

A battery was fabricated in the same procedure as in the Example 2 with the exception that in Comparative Example 5, 46.5 wt % of ethylene carbonate, 46.5 wt % of γ-butylolactone and 7 wt % of vinylene carbonate were used as an electrolyte in a positive electrode while 47.5 wt % of ethylene carbonate, 47.5 wt % of γ-butylolactone and 5 wt % of vinylene carbonate were used as an electrolyte in a negative electrode. Thereafter, a battery performance was evaluated in the same way as in Example 1.

Comparative Example 6

A battery was fabricated in the same procedure as in the Example 2 with the exception that in Comparative Example 6, 45 wt % of propylene carbonate, 45 wt % of γ-butylolactone and 10 wt % of vinylene carbonate were used as an electrolyte in a positive electrode while 44 wt % of ethylene carbonate, 44 wt % of γ-butylolactone and 12 wt % of vinylene carbonate were used as an electrolyte in a negative electrode. Thereafter, a battery performance was evaluated in the same way as in Example 1.

Comparative Example 7

A battery was fabricated in the same procedure as in the Example 2 with the exception that in Comparative Example 7, diethylene carbonate was used instead of γ-butylolactone. Thereafter, a battery performance was evaluated in the same way as in Example 1.

TABLE 1

| | | Positive electrode | | | | Negative electrodes | | | | Polymerization |
|---|---|---|---|---|---|---|---|---|---|---|
| | | Active material | Electrolyte | VC content | Polymerization method | Active material | Electrolyte | VC content | Polymerization method | method of battery |
| Examples | 1 | LiCoO$_2$ | EC:GBL = 1:1 | 7.0% | Ultra violet | Natural graphite | EC:GBL = 1:1 | 10.0% | Heat | |
| | 2 | LiCoO$_2$ | EC:GBL = 1:1 | 3.0% | Ultra violet | Natural graphite | EC:GBL = 1:1 | 10.0% | Ultra violet | Heat |
| | 3 | LiNiO$_2$ | EC:GBL = 1:1 | 0.0% | Ultra violet | Natural graphite | EC:GBL = 1:1 | 1.0% | | Heat |
| | 4 | LiNiO$_2$ | PC:GBL = 1:1 | 7.0% | Heat | Natural graphite | EC:GBL = 1:1 | 10.0% | Heat | |
| | 5 | LiMn$_2$O$_4$ | PC:GBL = 1:1 | 3.0% | Heat | Natural graphite | EC:GBL = 1:1 | 10.0% | Ultra violet | Heat |
| | 6 | LiMn$_2$O$_4$ | PC:GBL = 1:1 | 0.0% | Heat | Calcined graphite | EC:GBL = 1:1 | 1.0% | | Heat |
| Comparative Examples | 1 | LiCoO$_2$ | EC:GBL = 1:1 | 0.0% | Ultra violet | Natural graphite | EC:GBL = 1:1 | 0.0% | Ultra violet | Heat |
| | 2 | LiCoO$_2$ | PC:GBL = 1:1 | 0.0% | Ultra violet | Natural graphite | EC:GBL = 1:1 | 0.0% | Ultra violet | Heat |
| | 3 | LiCoO$_2$ | EC:GBL = 1:1 | 7.0% | Ultra violet | Natural graphite | EC:GBL = 1:1 | 2.0% | Ultra violet | Heat |
| | 4 | LiCoO$_2$ | PC:GBL = 1:1 | 5.0% | Ultra violet | Natural graphite | EC:GBL = 1:1 | 5.0% | Ultra violet | Heat |
| | 5 | LiCoO$_2$ | EC:GBL = 1:1 | 7.0% | Ultra violet | Natural graphite | EC:GBL = 1:1 | 5.0% | Ultra violet | Heat |
| | 6 | LiCoO$_2$ | PC:GBL = 1:1 | 10.0% | Ultra violet | Natural graphite | EC:GBL = 1:1 | 12.0% | Ultra violet | Heat |
| | 7 | LiCoO$_2$ | PC:DEC = 1:1 | 7.0% | Ultra violet | Natural graphite | EC:DEC = 1:1 | 10.0% | Ultra violet | Heat |

VC: Vinylene carbonate, EC: Ethylene carbonate, GBL: γ-butylolactone, PC: Propylene carbonate, DEC: Diethylene carbonate

TABLE 2

|  | Load characteristics | | | Temperature characteristics | | Cycle characteristics | |
| --- | --- | --- | --- | --- | --- | --- | --- |
|  | | Discharge | | Discharge | | | |
|  | Battery capacity mAh | capacity at 100 mA mAh | Retentivity % | capacity at −20° C. mAh | Retentivity % | Discharge capacity after 500 cycles mAh | Retentivity % |
| Example 1 | 109.0 | 98.7 | 90.6 | 86.5 | 79.4 | 97.2 | 89.2 |
| Example 2 | 105.0 | 97.5 | 92.9 | 92.3 | 87.9 | 99.7 | 95.0 |
| Example 3 | 104.5 | 99.5 | 95.2 | 89.2 | 85.4 | 98.5 | 94.3 |
| Example 4 | 106.3 | 102.1 | 96.0 | 91.5 | 86.1 | 101.0 | 95.0 |
| Example 5 | 115.3 | 109.7 | 95.1 | 97.5 | 84.6 | 105.3 | 91.3 |
| Example 6 | 98.2 | 97.2 | 99.0 | 92.8 | 94.5 | 92.3 | 94.0 |
| Comparative Example 1 | 95.4 | 24.5 | 25.7 | 72.3 | 75.8 | 72.3 | 75.8 |
| Comparative Example 2 | 105.2 | 35.6 | 33.8 | 65.2 | 62.0 | 68.3 | 64.9 |
| Comparative Example 3 | 102.3 | 65.4 | 63.9 | 55.6 | 54.3 | 92.3 | 90.2 |
| Comparative Example 4 | 98.2 | 85.3 | 86.9 | 78.5 | 79.9 | 72.3 | 73.6 |
| Comparative Example 5 | 101.3 | 23.5 | 23.2 | 89.6 | 88.5 | 89.3 | 88.2 |
| Comparative Example 6 | 105.8 | 57.2 | 54.1 | 42.3 | 40.0 | 85.2 | 80.5 |
| Comparative Example 7 | 100.4 | 86.6 | 86.3 | 21.2 | 21.1 | 85.2 | 84.9 |

In Table 1, there are shown compositions and fabrication procedures of electrodes and electrolytes of batteries in the examples of the present invention and the comparative examples thereof. In Table 2, there are shown initial capacities, load characteristics, low temperature characteristics, and cycle characteristics. According to Table 2, in any of the examples, there are shown excellencies in load characteristic, temperature characteristic and cycle characteristic of batteries, each fabricated according to a method of the present invention, and having a solid electrolyte containing a polymer obtained from a precursor solution at a content of vinylene carbonate suitable for each of the positive electrode and the negative electrode.

According to the present invention, by using a solid electrolyte containing a polymer obtained from a precursor solution at a content of vinylene carbonate suitable for each of a positive electrode and a negative electrode, it become possible to cause the positive electrode and the negative electrode to exert the highest performances and as a result, there can be provided a lithium polymer secondary battery excellent in load characteristic, temperature characteristic and cycle characteristic.

Furthermore, a lithium polymer secondary battery of the present invention employs a solid electrolyte, therefore, there is no chance of mixing between electrolytes. For this reason, a performance is hard to be degraded over repetition of cycles, thereby enabling a battery with a long lifetime to be provided.

What is claimed is:

1. A lithium polymer secondary battery comprising a negative electrode, a positive electrode and an electrolyte layer between both electrodes, wherein the negative electrode and the positive electrode each has a solid electrolyte prepared by incorporating an organic electrolytic solution into a polymer, the polymer is obtained by solidifying a precursor solution containing vinylene carbonate and a content of vinylene carbonate in the precursor solution for the positive electrode is smaller than that in the precursor solution for the negative electrode.

2. A lithium polymer secondary battery according to claim 1, in which a content of vinylene carbonate is 7 wt % or less in the precursor solution for the positive electrode while a content of vinylene carbonate is 10 wt % or less in the precursor solution for the negative electrode.

3. A lithium polymer secondary battery according to claim 1, in which the positive electrode and the negative electrode are different from each other in respect of kind of the polymer or the organic electrolytic solution composing the solid electrolyte, or in respect of composition of the organic electrolytic solution.

4. A lithium polymer secondary battery according to claim 1, in which the solid electrolyte contains γ-butylolactone as an organic solvent.

5. A lithium polymer secondary battery according to claim 1, in which the negative electrode contains a graphite as an active material, the solid electrolyte of the negative electrode contains at least ethylene carbonate as an organic solvent.

6. A fabrication method for a lithium polymer secondary battery of claim 1 comprising the steps of separately solidifying precursor solutions of polymers included in solid electrolytes of a positive electrode and a negative electrode; and thereafter, sticking the positive electrode and the negative electrode to each other with an electrolyte layer interposed therebetween.

7. A fabrication method for a lithium polymer secondary battery of claim 1 comprising the steps of preliminary-solidifying a precursor solution of a polymer included in a solid electrolyte of one of a positive electrode and a negative electrode, or separately preliminary-solidifying precursor solutions of polymers included in the solid electrolytes of the positive electrode and the negative electrode, thereafter, sticking the positive electrode and the negative electrode to each other with an electrolyte layer interposed therebetween and furthermore, heat treating the composite of the electrodes with the electrolyte layer to thereby solidify the precursor solutions preliminary-solidified.

* * * * *